United States Patent [19]

Thompson

[11] Patent Number: 4,510,047
[45] Date of Patent: Apr. 9, 1985

[54] SELECTIVE EXTRACTION SOLVENT RECOVERY USING REGENERATED CELLULOSE MEMBRANE UNDER REVERSE OSMOSIS CONDITIONS

[75] Inventor: John A. Thompson, Wyoming, Canada

[73] Assignee: Exxon Research and Engineering Co., Florham Park, N.J.

[21] Appl. No.: 561,169

[22] Filed: Dec. 14, 1983

[51] Int. Cl.³ .................. C07C 7/144; C10G 31/00
[52] U.S. Cl. .................................. 208/321; 585/818; 210/655; 208/308
[58] Field of Search .............. 208/308, 321, 326, 327; 585/818, 819; 210/655, 649, 500.2

[56] References Cited

U.S. PATENT DOCUMENTS

| | | | |
|---|---|---|---|
| 2,923,751 | 2/1960 | Binning et al. | 208/308 |
| 2,930,754 | 3/1960 | Stuckey et al. | 210/23 |
| 2,947,687 | 8/1960 | Lee | 210/23 |
| 2,958,656 | 11/1960 | Stuckey | 208/308 |
| 2,958,657 | 11/1960 | Binning et al. | 210/23 |
| 2,960,462 | 11/1960 | Lee et al. | 208/308 |
| 2,981,680 | 4/1961 | Binning | 210/23 |
| 2,985,588 | 5/1961 | Binning et al. | 208/308 |
| 3,140,256 | 7/1964 | Martin et al. | 210/23 |
| 3,225,107 | 12/1965 | Kirkland et al. | 260/652 |
| 3,228,876 | 1/1966 | Mahon | 210/22 |
| 3,305,595 | 2/1967 | Paulson | 585/819 |
| 3,306,849 | 2/1967 | Bozeman, Jr. et al. | 208/321 |
| 3,370,102 | 2/1968 | Carpenter et al. | 260/674 |
| 3,451,925 | 6/1969 | Morris et al. | 208/321 |
| 3,494,780 | 2/1970 | Skiens | 117/63 |
| 3,556,991 | 1/1971 | Gerhold | 208/321 |
| 3,919,075 | 11/1975 | Parc et al. | 208/180 |
| 4,062,882 | 12/1977 | Sen Gupta | 260/428.5 |
| 4,368,112 | 1/1983 | Thompson et al. | 208/321 X |

FOREIGN PATENT DOCUMENTS 2116071 9/1983 United Kingdom.

OTHER PUBLICATIONS

Perry et al., "Progress in Separation and Purification", vol. 3, 1968, pp. 122–125.
"Separation of Aromatics and Naphthenes by Permeation Through Modified Vinylidene Fluoride Films", McCandless, Ind. Eng. Chem. Process Des. Develop., vol. 12, No. 3, pp. 354–359 (1973).
"The Influence of Cellulose Structure on the Swelling of Cellulose in Organic Liquids", Phillip, et al., J. Polymer Sci. Symposium No. 42, 1531–1543 (1973).
"Swelling of Cellulose Induced by Donor-Type Solvents–Part I", Borbely-Kuszmann, et al., Kolor Ert. 17 #-12: 295–301 (1975) (translation).
"Time Dependence of the Swelling of Regenerated Cellulose Fibers & Films in Organic Liquids", Phillip, et al., Faserforsch Textiltech 24 #3, 106–112 (1973) (translation).
"Optimized Cellulose Membranes for Artificial Kidney Dialysis Applications", Meltzer, et al., vol. XIV, Trans. Amer. Soc. Artif. Int. Organs, 12–18 (1968).
"Regeneration of Used Lubricating Oils by Ultrafiltration", Defives, et al., Information Chimie #175, 127–131, Mar. 1978.

Primary Examiner—Delbert E. Gantz
Assistant Examiner—Glenn A. Caldarola
Attorney, Agent, or Firm—Joseph J. Allocca

[57] ABSTRACT

Selective extraction solvents such as NMP, phenol or furfural employed for the extraction of specialty oils, i.e. lubricating, transformer and insulating oils, to remove undesirable aromatic components therefrom, is itself recovered from the extract stream and/or raffinate streams by preferential ultrafiltration through selective membranes of regenerated cellulose. The extract stream, because of its higher solvent content, is the preferred stream for solvent recovery treatment by the reverse osmosis membrane permeation technique. Solvent recovery employing membrane permeation exhibits the advantage of not being energy intensive as is distillation or stripping. The solvent is recovered at a high enough flux rate and at a high enough level of purity to be introduced back into the solvent extraction process optionally at some point in the process wherein the composition of the recovered solvent approximately matches the composition of the solvent present in the process at the point of introduction.

12 Claims, 6 Drawing Figures

INTEGRATED NMP EXTRACTION PROCESS

E EXTRACTION COLUMN
DR RAFFINATE DISTILLATION SYSTEM
M MEMBRANE UNIT
DE EXTRACT DISTILLATION SYSTEM
MS MEMBRANE RECOVERED SOLVENT
DS DISTILLATION RECOVERED SOLVENT

FIG. 1

MEMBRANE TEST EQUIPMENT AND CELL

1. MILLIPORE 47mm DIAM. FILTER HOLDER
2. 500 cc HIGH PRESSURE RESEVOIR
3. SEALLESS HIGH PRESSURE PUMP
4. FUNNEL TO FACILITATE CHARGING UNIT WITH FEED

SELECTIVE EXTRACTION SOLVENT RECOVERY USING REGENERATED CELLULOSE MEMBRANE UNDER REVERSE OSMOSIS CONDITIONS

BRIEF DESCRIPTION OF THE INVENTION

Extraction solvents such as N-methyl-2-pyrrolidone (NMP), phenol, furfural N,N-dimethylformamide (DMF), dimethylsulfoxide (DMSO) and dimethylacetamide (DMAc) used to remove undesirable aromatic components from specialty hydrocarbon oils such as lubricating oils and transformer oils can be partially recovered from the extract streams resulting from such extraction process, by the liquid permeation under pressure through a specially discovered reverse osmosis membrane of part of the solvent in said stream. Series coupling of the membrane process with distillation results in significant energy savings over distillation alone.

Regenerated cellulose membrane was discovered to be effective for the separation of extraction solvents from lube oils. The major benefit of the present invention is the energy saving and the potential unloading of the distillation unit normally employed to recover the solvent for recycle. Further, the solvent is recovered at a high flux and at a high enough purity so that the recovery process when coupled with distillation constitutes a viable and economic alternative to distillation alone. The reverse osmosis membrane separation unit employing regenerated cellulose membranes separates and recovers part of the solvent from the extract stream and is located between the solvent oil extraction unit and the solvent recovery towers.

The solvent which permeates through the membrane is recycled with the distilled solvent to the extractor. Alternatively, since this membrane recovered solvent contains small amount of copermeated oil, it may be recycled to some point in the extractor wherein the composition of the recovered solvent approximately matches the composition of the solvent present in the extractor. The balance of the solvent containing stream is subjected to standard distillation for solvent recovery with the solvent being recycled, in combination with any needed volumes of make-up solvent to the extractor.

BACKGROUND OF THE INVENTION

Solvent extraction processes are commercially practiced in the areas of lube oil and transformer oil upgrading to remove undesirable aromatics. In the practice of such extraction processes, the selective solvent used is recovered from the extract and raffinate phases by distillation and stripping which are energy intensive.

U.S. Pat. No. 3,566,991 sought to improve the recovery of aromatic products by employing a dialysis membrane separation technique. In U.S. Pat. No. 3,566,991 aromatics are separated from a mixture of aromatics and non-aromatics. The specification teaches a process which involves the steps of (1) using a selective solvent to obtain a solvent rich aromatics extract phase and a solvent lean non-aromatics raffinate phase, (2) passing the extract phase to a first cell of a dialysis chamber containing at least 2 cells separated by a membrane permeable to the aromatics component of the extract phase thus the solvent permeates freely without an applied pressure, (3) removing solvent from the first cell and recovering aromatics from the second cell and (4) recycling at least a portion of the recovered solvent after stripping to the extraction zone. No flux, flow or purity data is presented. The key to this patent is the unique aromatics separation via a dialysis membrane process. Basically the process is used to increase the yield of the extraction process using dialysis in addition to distillation. The respective solvent from each product was separated/recovered by distillation and not by means of a membrane.

U.S. Pat. No. 3,725,257 deals with a process of separating aromatic hydrocarbons from hydrocarbon mixtures. The mixture of liquid hydrocarbons is extracted in the liquid phase with ethylenediamine solvent containing 0–20 wt% water. The extract phase comprises predominantly aromatic hydrocarbons, solvent and a minor amount of non-aromatic hydrocarbons. The raffinate phase comprises predominantly non-aromatic hydrocarbons. Each phase is separately collected. The extract phase is cooled to a temperature lower than the temperature of the extraction step and then separated into a heavier solvent containing phase and a lighter hydrocarbons containing phase which is further processed. It must be noted that the separation of the extracted phase into separate solvent and hydrocarbon phases is effected by cooling and decanting and not membrane separation. The heavier solvent separates on cooling and is recycled to the extraction zone. In a specific embodiment this solvent recycle is to a point intermediate between the feeding point of the ethylenediamine selective solvent and the feed point of the mixture of hydrocarbons to be extracted.

INVENTION

It has been discovered that extraction solvents such as N-methyl-2-pyrrolidone (NMP), phenol, furfural, N,N-dimethylformamide (DMF), dimethylsulfoxide (DMSO) and dimethylacetamide (DMAc) (preferably NMP, phenol and furfural) which are employed as aromatics extraction solvents for the extraction of lubricating, transformer, insulating or mineral oils can be partially recovered from the resulting extract stream.

It has been discovered that a reverse osmosis regenerated cellulose membrane is selectively permeable to the extraction solvent and highly impermeable to the aromatic hydrocarbons. This membrane satisfies the pore size and chemical nature requirements that will provide the desired rejection of the extract oils. Regenerated cellulose membranes are the only membranes currently available which are compatible with the solvent systems employed for selective aromatics extraction, while capable of extract oil rejection.

In treating typical base oil feedstocks, 1–2 volumes of solvent are contacted countercurrently with the oil to remove the undesirable aromatic components therefrom. This treatment results in the production of (1) a raffinate stream comprising a major portion of dearomatized oil and some solvent and (2) an extract stream comprising a major portion of solvent and the bulk of the aromatic components removed from the base oil stream, together with some saturates which are coextracted with the aromatics.

The use of the preferred solvent NMP (with or without minor amounts of water present) to selectively extract aromatic constituents from oil streams is the subject of many patents including U.S. Pat. No. 3,843,515, U.S. Pat. No. 3,476,681, and U.S. Pat. No. 4,125,458 hereby incorporated by reference. U.S. Pat. No. 4,057,491 and U.S. Pat. No. 4,168,226 (hereby incorporated by reference) are fairly representative of typical NMP recovery processes and demonstrate the large energy requirements encountered.

Because the extract stream contains most of the solvent, all or a portion of it is subjected to the membrane separation process, to recover part of the solvent. Employing this membrane recovery process coupled with distillation results in substantial energy savings over distillation units normally employed alone to effect such separations. By comparison, the energy requirements of the membrane recovery process needed to maintain sufficient driving pressure to overcome solvent osmotic pressure are substantially lower than distillation energy needs. The solvent recovered via the membrane contains small quantities of entrained aromatics but is of sufficient purity to allow reuse and recycle without further upgrading. However, depending on the amount of contamination of the solvent with copermeated aromatics, the recovered solvent may be recycled to the start of the extraction process or it may be introduced at an intermediate stage of the extraction process wherein it's composition approximately matches the composition of the solvent at the point of introduction.

The remaining solvent is recovered by subjecting the raffinate stream, and the retentate portion of the extract phase which remains after membrane recovery to distillation and stripping. Since a substantial portion of the solvent has been recovered using the membrane recovery technique, the distillation or stripping energy requirements become much lower than in typical solvent recovery schemes.

In the practice of the present invention any where up to 80% of the solvent in the extract solution can be recovered by reverse osmosis through the membrane. Preferably the amount of solvent recovered is in the order of about 50%. The amount of solvent recovered from the feed solution containing (on average) 80% solvent is mostly a question of the degree of recovery desired, balanced by the alternate consideration of flux. If half of the solvent is recovered the retentate solution composition changes from 80% to 66% solvent while the flux declines accordingly. The solvent recovered will generally contain from 1 to 5 wt% oil depending on the oil grade but this concentration (contaminants) can, of course, be decreased simply by passing the recovered solvent through one or more additional permselective membrane.

The choice of the operating temperature used in the present invention is limited by two parameters. The lower limit is set by the waxy nature of the feed stream while the upper limit is set by the temperature resistance of the permselective membrane. NMP (the preferred solvent) for example can therefore usually be recovered from the feed at a temperature as low as about 20° C. with upper temperatures approaching 204° C., the boiling point of NMP. Regardless of the selective extraction solvent used, the extraction process itself and the subsequent membrane separation process are carried out at about 40°–50° to 110° C. (see example 10). It must be recognized that by operating the extraction at the lower temperatures the subsequent permeation rate through the membrane at that lower temperature is lower (but at a higher level of selectivity) than at the higher temperature regions where the rate increases, but which increased rate is accompanied by a decline in selectivity.

It is necessary that the solvent-oil phases are contacted with the selected membrane under an applied pressure in order to effect the desired separation. The pressures employed are to some extent controlled by the concentrations of the oil in the solvent above the membrane. Pressures high enough to overcome the osmotic pressure is required. High oil concentrations give rise to high osmotic pressures which must be overcome to permeate the solvent. Typical pressures employed range from about 400–600 psig. Operation at 1000 psig appears to be about the maximum desirable pressure due to membrane compaction and practical equipment limitations.

Concomitant with the recovery of solvent from the membrane separation process is the increase in oil concentration of the retentate. This can and will in turn produce a two phase system. (If allowed to separate, these phases will form two layers, namely an oil rich phase and a large volume of solvent rich phase). This condition is also obtained with the addition of water or if the solution temperature is lowered. Thus all three cases change the solubility of oil in NMP (or other solvent) and can be followed using a standard ternary phase diagram technique.

The membrane appears to more easily recognize the solvent rich phase which now contains less oil and thus gives better flux. The two phase feed when processed through the equipment and pump will appear as an emulsion which is in turn passed over the membrane surface. The oil rich phase does not contribute to an increase in osmotic pressure and hence better flux is achieved while selectivity is still maintained.

Reverse osmosis membranes useful for the present process should be selectively permeable to and compatable with the extraction solvents and impermeable to the oil. Regenerated cellulose, has been found to satisfy these criteria; although other reverse osmosis membranes satisfying these criteria could possibly be found which may be useful for the above separation. The identification of such membranes is not and cannot be known or predicted with any certainty at this time. For high permeation rates, a thin membrane is preferably employed. In general membrane thickness will be in the range 0.4 to 1 mils, preferably less than 1 mil. The membrane employed should be free from holes and other defects which would destroy its semipermeable nature. The term "regenerated cellulose" describes all cellulose membranes which have been prepared by the current art, such as by the viscose process, the cupramonium process and the cuene process. Regenerated cellulose membranes useful in this invention are commercially available from various companies for various aqueous separation processes and are normally supplied containing a glycol such as glycerol. The glycerol is present as a humectant in order to prevent membrane drying. If the membrane is allowed to dry out, its internal cell structure collapses, thereby rendering the membrane unsuitable for reverse osmosis processes.

As has heretofore been stated, supra, regenerated cellulose membranes are commercially available from a number of suppliers, and are sold in terms of molecular weight cutoff ranges or "equivalent pore size". The absolute values of pore size of a semipermeable membrane cannot be categorically stated for many reasons. Pore sizes usually are too small to be measured by physical methods. Pore sizes change with temperature and with the solvent with which the membrane is in contact due to swelling or shrinkage, etc. A common approach is to use a statistical average based on the size of molecules too large to permeate through the membrane. This can be accomplished using a membrane "sizing" kit. A list of twelve standard compounds used by Spectrum Medical Industry to "size" regenerated cellulose, membranes is shown in Table I.

TABLE I

COMPOUNDS FOR SIZING MEMBRANES

| Compound | Formula Weight | Diameter Å |
|---|---|---|
| Urea | 60 | 5.4 |
| Glucose | 180 | 7.2 |
| Sucrose | 312 | 8.8 |
| Raffinose | 504 | 11.2 |
| Salmine | 6,000 | 24.0 |
| Cytochrome C | 12,000 | 25.0 |
| Lysozyme | 14,000 | 31.0 |
| Myoglobin | 17,000 | 43.0 |
| Chymotrypsinogen | 25,000 | 40.0 |
| Hemoglobin | 67,000 | 55.0 |
| APO Ferritin | 480,000 | 61.0 |
| Albumin | 67,000 | 145 × 50 × 22 |

These compounds are roughly spherical in shape. The molecular weight cut-off is quoted as the formula weight of the compound which is 98% retained by the membrane. Thus, a regenerated cellulose membrane sold as having a molecular weight cut-off of from between about 6000 to 8000, in general, will not permit permeation of spherical protein molecules in aqueous solution having a molecular weight exceeding from about 6,000 to 8,000.

Regenerated cellulose membranes are generally made in a molecular weight cut-off (MWCO) range of from about 3000 MWCO to 300,000 MWCO corresponding to pore diameters of from about 10 Å to 300 Å when using proteins in water to characterize them. However, NMP as well as other solvents swell regenerated cellulose causing the pore diameter to change. In the present invention, a regenerated cellulose membrane having a molecular weight cut-off (MWCO) of about 3,000 to about 25,000 preferably about 3,000 to about 10,000-12,000 as determined by the aqueous protein sizing technique (described above) prior to exposure to NMP is desirable. A membrane with much lower MWCO would have low flux and would be impractical, while a membrane with much higher MWCO would have low selectivity and would similarly be impractical.

In using the regenerated cellulose membranes of the present invention for the separation of NMP from extract oil, the membranes can be conveniently used in any of the typical configurations now employed in the art. Regenerated cellulose membranes are manufactured in the form of sheets, tubes, fibers, etc. Tubes and fibers can be employed in the form of a module element, such as that described in U.S. Pat. No. 3,228,877. Membranes in sheet form can be fabricated into spiral wound membrane elements as embodied, for example, in U.S. Pat. No. 3,417,870, U.S. Pat. No. 3,173,877, U.S. Pat. No. 3,367,504, U.S. Pat. No. 3,386,583, and U.S. Pat. No. 3,397,790.

In fabricating spiral wound elements for use in an NMP environment, care must be exercised in selecting the proper components and adhesive system for element fabrication.

The spiral wound element can comprise layers of regenerated cellulose wound around a metal central tube containing holes for the permeate, the membrane layers being separated by alternate layers of a permeate carrier, e.g., woven fiberglass cloth or a material such as the permeate carrier from Hornwood Incorporated, identified as Hornwood Style 8415, and a feed spacer, e.g., Vexar (a polypropylene mesh). Membrane layers are sealed along the edges using an adhesive to sandwich the permeate carrier into a closed envelope tube, leaving the perforations in the central tube as the only permeate outlet. This assembly is capped at each end with nylon or aluminum U cup carrier and anti-telescoping devices. The adhesives are specific silicon/primer systems. A silicon/primer system which may be used to bond the membrane to the central tube, to form the membrane edge seals to bond the nylon or aluminum (end pieces U cup carriers and anti-telescoping devices) and to form the element outer wrap is preferably a two component condensation type red polysiloxane adhesive such as General Electric (GE) RTV silicon 31 in combination with a catalyst such as GE 9811 or dibutyl tin dilaurate (DBT). The surfaces to be bonded are primed using a polysiloxane in solvent primer such as GE SS-4044. The silicon and GE-9811 catalyst are preferably used in a ratio of 19/1 and the primer is preferably diluted with isopropylalcohol (IPA) at a dilution of up to 4 parts IPA to 1 part primer. The DBT catalyst (a liquid catalyst) is preferably employed at a concentration of 0.10% to give an adequate pot life. The primed surfaces are permitted to dry prior to application of the adhesive/catalyst mixture so as to avoid adhesive cure inhibition.

These silicon/primer systems are described and claimed in copending application, U.S. Ser. No. 6/561477, filed even date herewith in the names of H. F. Shuey and W. M. King.

Figure 1:
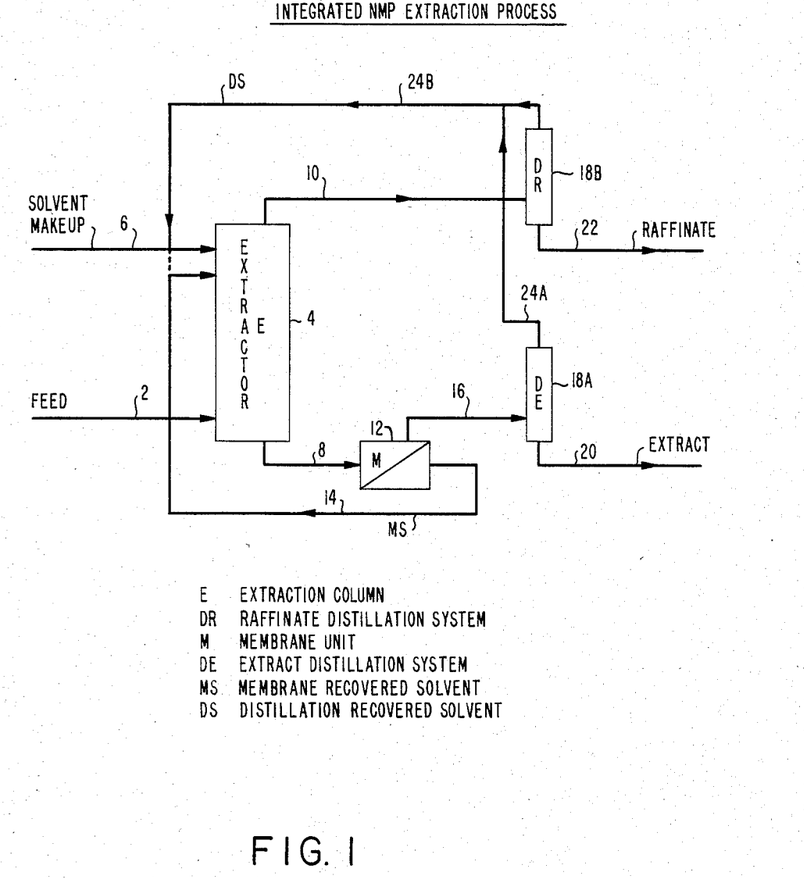
FIG. 1 presents a schematic of an intergrated NMP extraction process (by way of example) utilizing NMP recovery by means of a membrane unit in combination with distillation and intermediate injection of the recovered NMP to the extraction zone.
Figure 2:
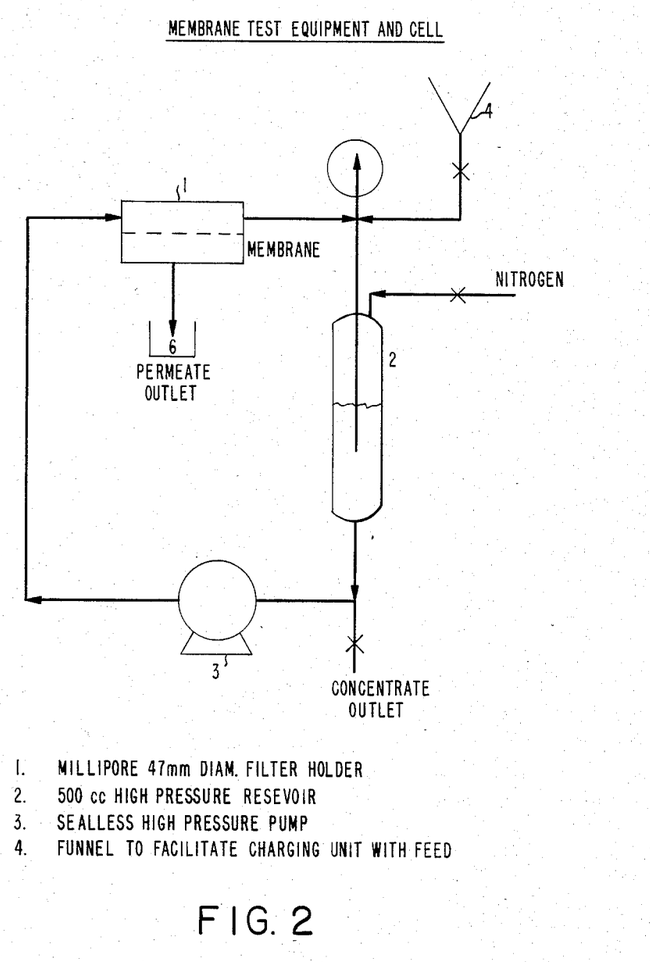
FIG. 2 describes the test cell apparatus employed in the Examples.

DETAILED DESCRIPTION OF FIGS. 1 AND 2

FIG. 1

The hydrocarbon feed stream to be extracted is fed via line 2 to the extraction unit 4. Selective extraction solvent (NMP) is likewise fed into unit 4 via line 6. The feed and the NMP pass countercurrently in unit 4 resulting in the generation of a raffinate stream and an extract stream. The raffinate stream is recovered from unit 4 by means of line 10 and is fed to a solvent recovery zone unit 18b. The extract stream is recovered via line 8. This extract stream contains the bulk of the NMP solvent and is subjected to selective solvent recovery in a permselective membrane unit 12 wherein a substantial portion of NMP is recovered. While for the sake of simplicity unit 12 is represented as a single unit, in actual operation "unit 12" can be made up of any number of membrane modules operating in parallel so as to provide sufficient surface area to effect the desired volume level of recovery. Further, the permeate from any single unit can be fed to a second series of units or modules (modules in series), so as to produce a recovered NMP stream of increased purity.

The recovered NMP is sent via line 14 for recycle to the extraction unit 4 for introduction at some intermediate point in the unit 4. The extract phase (now lean in NMP) is collected from membrane unit 12 via line 16 and is sent to conventional solvent recovery zone, unit 18a. In solvent recovery zones 18 (a and b) entrained NMP in the raffinate phase and extract phase is recovered in pure form, usually by distillation. The pure recovered NMP is recycled to the initial NMP feed line 6 via line 24 (a and b). Solvent free raffinate phase and extract phase are collected via lines 22 and 20 respectively, and sent on for further processing.

FIG. 2

The apparatus used in the examples consists of a membrane cell (1), a feed reservoir (2) and a recirculating pump (3). All parts are connected via high pressure tubing so that a constant flow of fluid passes across the surface of the membrane, to minimize concentration polarization.

To assemble and prepare the unit, a regenerated cellulose membrane was first clamped between the two flange faces of the millipore filter holder (1), the holder being equipped with a porous support for the membrane which allows liquid to permeate and be collected in vessel 6. The feed (a mixture of NMP and extract oils) is charged to reservoir (2) via funnel 4. The unit is then sealed by closing all valves, then nitrogen is introduced until the operating pressure is attained. Pump 3 is started, which recycles the feed fluid from the reservoir across the membrane surface. The permeating fluid (NMP solvent) is collected in vessel 6 and analyzed for NMP purity and permeation rate (flux).

EXAMPLE 1

Membrane Compatibility

Various membrane materials were contacted with extraction solvents at 50° C. to determine their compatability (see Table II). It can be seen that for the separation of NMP from extract and or raffinate streams the membranes are to be selected from regenerated cellulose, polypropylene or polyethylene. The latter are not available in suitable porous membrane forms.

TABLE II

| | | MEMBRANE COMPATABILITY | | | | |
|---|---|---|---|---|---|---|
| | Action in NMP | Compatability[4] with assorted solvents at 50° C. | | | | |
| Membrane | at 20° C. | NMP[1] | Phenol | Furfural | Sulfolanes[2] | Glycols[3] |
| Regenerated cellulose | intact after 60 days | Good | Good | Good | Good | Good |
| Cellulose acetate | slowly deteriorates | Poor | Soft | Poor | Poor | Good |
| Polypropylene | intact after 60 days | Good | Good | Good | Good | Good |
| Polyethylene | intact after 60 days | Good | Good | Good | Good | Good |
| Polyimides | | Good/poor[5] | Poor | Poor | Poor | Good |
| Polycarbonate (etched) | dissolved | Poor | Poor | Good | Good | Good |
| Polyvinylchloride | dissolved | Poor | Soft | Poor | Poor | Good |
| Teflon | slowly deteriorates | Good | Good | Good | Good | Good |
| Mixed cellulose esters | dissolved | — | — | — | — | — |
| PTFE Pellicon | dissolved | — | — | — | — | — |
| Polyamide | dissolved | — | — | — | — | — |

[1]n-Methyl 2 Pyrrolidone
[2]Sulfolane
[3]Diethylene glycol
[4]Rating of Good, being little or no reaction of solvent with membrane or Poor, being the membrane swells or dissolves
[5]Some polymers

EXAMPLE 2

NMP Flux

Figure 3:
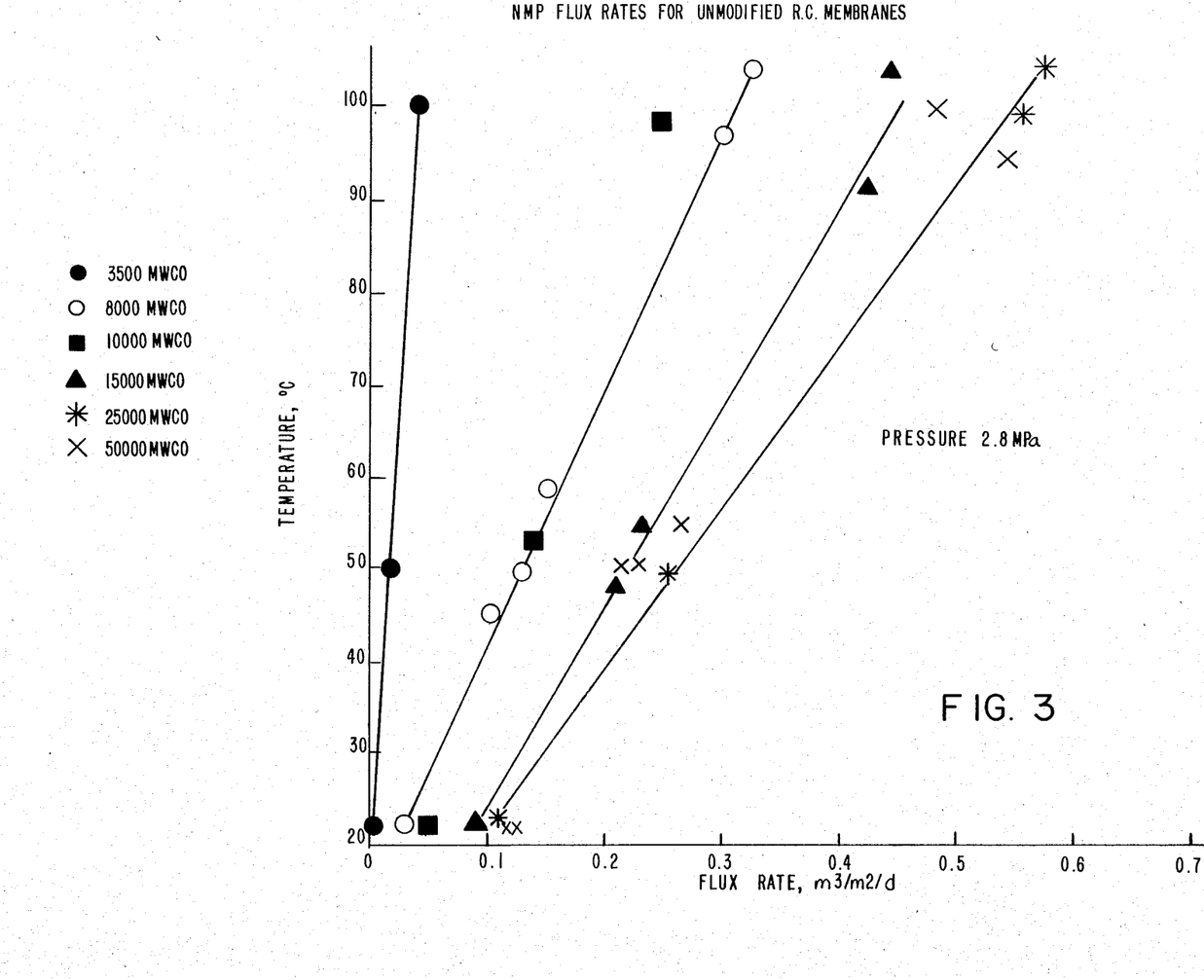
FIG. 3 shows the relationship between temperature and membrane molecular weight cutoff on NMP flux rate.

In order to establish a base point, regenerated cellulose membranes (from Spectrum Medical Industries) of various molecular weight cut-off (3,500 to 50,000) were tested in the presence of pure NMP at about 22° C., about 50° C. and about 100° C. The applied pressure was 400 psig. The results are presented in Table III. The maximum temperature employed was 105° C. As is seen, flux increases with increasing temperature. FIG. 3 graphically presents this data.

The expected increase in flux for higher MWCO membranes was not realized for the 50,000 MWCO membrane. It repeatedly had lower flux (at 50° C. and 100° C.) than the 25,000 MWCO membrane. The reason for this is not known at this time.

TABLE III

| NMP FLUX FOR UNMODIFIED REGENERATED CELLULOSE MEMBRANES | | | | | | | | | |
|---|---|---|---|---|---|---|---|---|---|
| MWCO | 3500 | 8000 | 8000 | 10000 | 15000 | 25000 | 50000 | 50000 | 50000[(1)] |
| Material | A | B | B' | C | D | E | F | F' | F" |
| Flux (Temp in brackets °C.) l/m²d | 4 (22) | 56 (22 C) | 37 (22) | 48 (22) | 94 (22) | 104 (22) | 116 (22) | 128 (22) | 119 (22) |
| | 17 (50) | 150 (59) | 110 (50) | 115 (53) | 250 (50) | 250 (50) | 267 (55) | 229 (51) | 210 (50) |
| | | 106 (45) | | | | | 208 (50) | | |
| | 35 (100) | | 320 (105) | 242 (99) | 420 (92) | 549 (100) | 538 (100) | | 480 (100) |
| | | | 295 (97) | | 440 (105) | 638 (105) | 535 (95) | | |

[(1)]Membrane pretreated using water.

EXAMPLE 3

Selectivity of the Membrane

Figure 4:
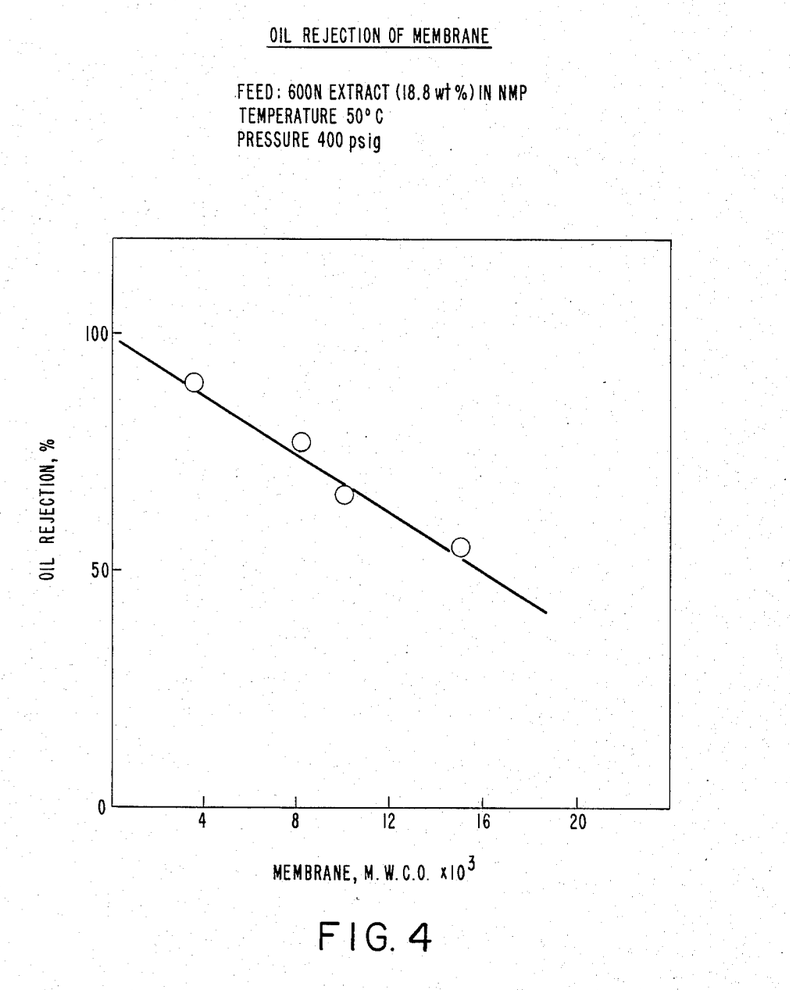
FIG. 4 shows the % oil rejection as a function of membrane molecular weight cut off.

Membrane selectively for NMP was determined by using as the test feedstream an extract solution obtained by contacting a 30 grade (600 neutral) waxy distillate with NMP, and separating the aromatic rich phase (extract) for contacting with the test membrane. The extract phase contained 18.8 wt% 600N oil and aromatics in NMP. The data are presented in Table IV. The results using membrane samples A–D at 50° C. are graphically presented in FIG. 4. Selectivity is expressed as the membranes ability to reject oil as a precentage. This figure shows that as the membrane molecular weight cutoff size increases (i.e., pore size of the membrane increases) the rejection declines. Thus if highly purified NMP is preferred one would choose a membrane with a lower MWCO.

TABLE IV

NMP/EXTRACT SEPARATIONS USING REGENERATED CELLULOSE MEMBRANES
Feed composition: 18.8 wt % 600N extract in NMP (81.2% NMP)
(Process run to about 1% recovery)

| MWCO | 3500 | 8000 | 10000 | 15000 | 25000 |
|---|---|---|---|---|---|
| Material | A | B' | C | D | E |
| Film Thickness in mils | 1.0 | 0.8 | 0.9 | 0.9 | 0.9 |
| Operating Pressure | | | 400 PSIG | | |
| Flux (temp in brackets) $1/m^2/d$ | 7.5(50) 20(83) | 47(50) 83(100) | 77(49) 130(83) | 113(50) 150(68) | 110(55) 280(105) |
| Permeate and retentate oil contents, wt % (temp in brackets) | | | | | |
| Permeate | 2.1(50) | 4.5(50) | 6.4(49) | 8.5(50) | 9.9(55) |
| Retentate | 18.8(50) | 18.8(50) | 18.8(49) | 18.8(50) | 19.6(55) |
| Permeate | 3.5(83) | 6.6(100) | 8.2(83) | 9.6(68) | 10.6(105) |
| Retentate | 19.0(83) | 21.1(100) | 19.9(83) | | 18.8(105) |

EXAMPLE 4

Evaluation of Thin Regenerated Cellulose Membranes

Two additional membrane materials (from ENKA) were examined. The materials (F and G) possessed MWCO of about 10,000–12,000 and film thickness of 0.4 (PM100) and 0.7 (PM250) mils respectively. They were tested employing a 150N oil/NMP mix containing 86.3% NMP. The results are presented in Table V. High flux is obtained using the thin membranes of 0.4 mils while still achieving good levels of separation.

TABLE V

| Material | F | G |
|---|---|---|
| Film Thickness (mils) | 0.4 | 0.7 |
| Feed oil | 150N | 150N |
| NMP content (%) | 86.3 | 86.3 |
| Operating condition | | |
| Pressure (psig) | 400 | 400 |
| Temp, °C. | 100 | 100 |
| Permeate flux $1/m^2/d$ | 392 | 168 |
| oil in permeate % (NMP Purity) | 4.6 | 5.0 |

EXAMPLE 5

Comparison of Lube Oil Grades

Figure 5:
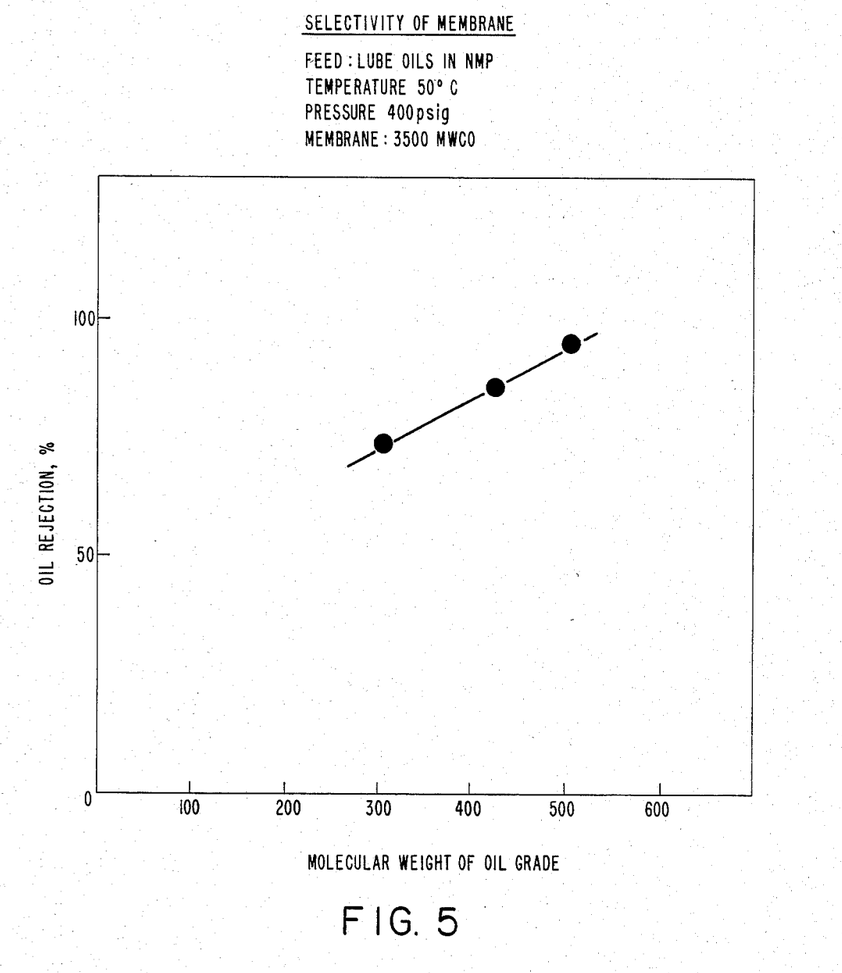
FIG. 5 shows the % oil rejection as a function of the molecular weight of the oil (grade of oil)

Extraction solutions from 60N and 150N oils were compared with the 600N oil runs. Only the 3500 MWCO membrane (Material A) was tested. Runs were made using 20 and 40% concentrations of extract oil in NMP at 50° C. and 100° C. The results are presented in Table VI. The molecular weight (MW) of the lube oil grade is plotted against oil rejection in FIG. 5 for those runs in Table VI identified by an *. As can be seen, selectivity for extract oils is less for the lower (lighter) grade lube oils. These oils are of lower molecular weight and permeate more readily through the membrane. This becomes especially evident at the higher temperatures. However, it must be noted that even for the light oil (60N) the membrane did effect separation between NMP and oil and did yield NMP of lower oil content than that possessed by the feed stream. The choice of membrane or the molecular weight of the oil grade determines the selectivity in terms of oil rejection.

TABLE VI

COMPARISON OF LUBE GRADES[1]

| Membrane | Regenerated Cellulose 3500 MWCO | | | | | | | | | | |
|---|---|---|---|---|---|---|---|---|---|---|---|
| Lube Grade | 60N | | | | 150N | | | | 600N | | |
| feed composition | | | | | | | | | | | |
| wt % extract in NMP | 21.1 * | | 40 | | 18.8 * | 40.0 | | 4.9 | 18.8 * | | 37.8 |
| Temp, °C. (Flux, $1/m^2/d$) | 50 | 100 | 50[2] | 100 | 50 | 50[2] | 100 | 50 | 50 | 100 | 50 |
| Pure NMP | — | — | 27 | — | 16 | 27 | — | 15 | 17 | 35 | 17 |
| Extract | 10 | 30 | 7 | 15 | 11 | 16 | 38 | 14 | 8 | 20 | 6 |
| Selectivity (oil content, wt %) | | | | | | | | | | | |
| Permeate | 5.7 | 7.7 | 12.2 | 17.8 | 2.8 | 3.2 | 4.4 | 0.6 | 1.1 | 2.1 | 3.5 (83° C.) | 6.4 |
| Retentate | 21.1 | | 40 | 46.3 | 18.8 | 40 | 42.9 | 4.9 | 5.8 | 18.8 | | 37.6 |

[1]Operating pressure 2858 kPa (400 psig)
[2]New supply of membrane having higher flux - (compared to Table III)

EXAMPLE 6

Membrane Optimization

Figure 6:
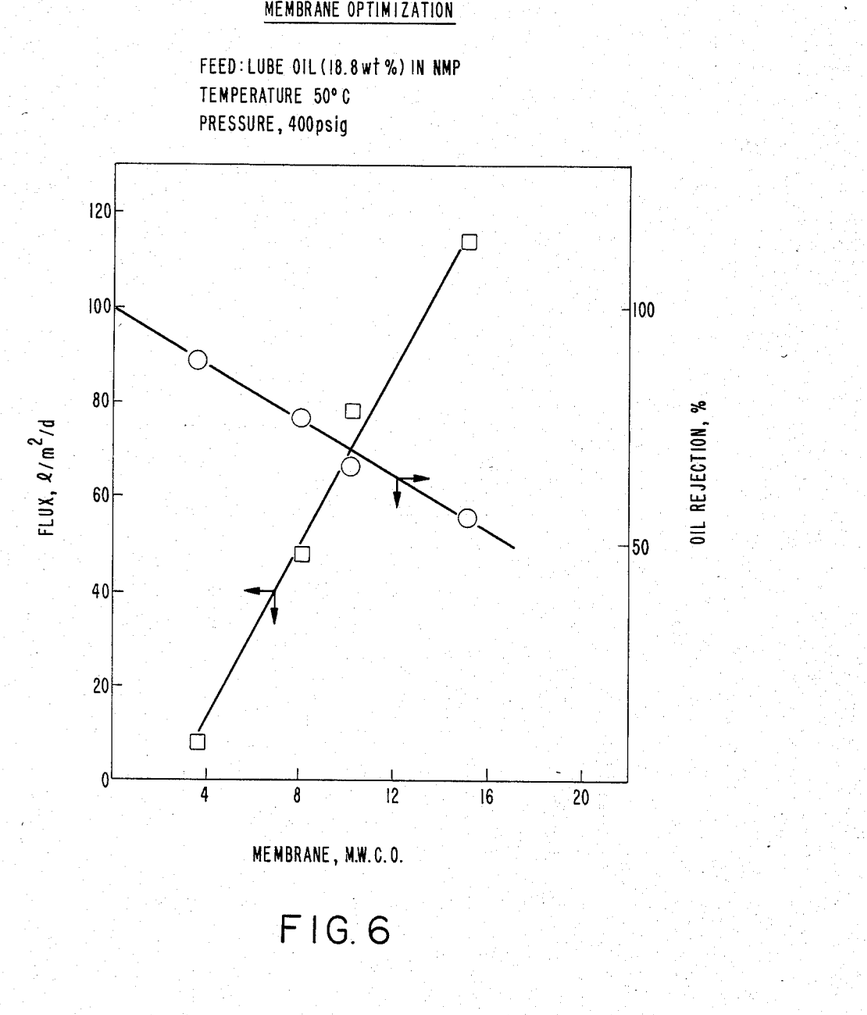
FIG. 6 shows the relationship between flux and % oil rejection as functions of membrane molecular weight cut off.

The previous examples have shown that (1) large pore membranes (i.e. those with high MWCO) give high fluxes, (2) that membranes with small MWCO give high oil rejection and selectivity, (3) that high molecular weight oil grades, are better rejected. Thus skill is required in selecting a membrane to obtain the best flux and selectivity for a given lube oil grade. An example of this is shown in FIG. 6. The intersect of the two curves shows that a membrane of, in this case, about 10,000

MWCO gives the highest flux at 70 l/m²/d at 70% oil rejection, in this case on a 600N oil.

EXAMPLE 7

(a) A feed which contained 21.5 wt% 150N oil in NMP was contacted at 100° C. and 3446 KPa (500 psi) with a PM 100 regenerated cellulose membrane (0.4 mils thick, 10,000 MWCO). A permeate which is 9.2 wt% 150N oil in NMP was recovered. Flux was 549 l/m²d and rejection was 57%.

(b) A feed which contained 26.3 wt% 750N oil in NMP was contacted at 110° C. and 3446 KPa (500 psi) with a PM-100 regenerated cellulose membrane (0.4 mils thick, about 10,000 MWCO). A permeate which is 9.5 wt% 750N oil in NMP was recovered. Flux was 529 l/m²d and rejection was 64%.

EXAMPLE 8

Effect of Feed Concentration

The effect of feed composition on flux and selectivity was examined employing a 600N extract feed and the 3500 MWCO membrane (material A). Solutions containing about 5, 20 and 40% (wt) oil extract in NMP operated at 50° C. and 400 psig (2857 kPa), gave approximately 1, 2 and 6 wt% oil in NMP. See Table VII. From this it is clear that if one were to cascade to the NMP recovered from a unit through a series of membrane units recovered NMP of high quality will be obtained.

TABLE VII

EFFECT OF FEED CONCENTRATION ON PERMEATE QUALITY AND FLUX
FEED: Extract oils from 600N processing

| Run No. | I | II | III |
|---|---|---|---|
| Membrane (Material A) | | 3500 MWCO | |
| Feed Comp. wt % extract oil in NMP | 4.9 | 18.8 | 37.8 |
| Flux, l/m²/d | 14 | 8 | 6 |
| Oil content, wt % | | | |
| Permeate | 0.6(1.1) | 2.1 | 6.4 |
| Retentate | 4.8(5.8) | 18.8 | 37.6 |

Operating conditions: 50° C. and 2857 kPa pressure (400 psig).

EXAMPLE 9

Phenol Solvent Recovery

Phenol recovery from lube extract solutions using a regenerated cellulose is demonstrated in this example. An extract 60N oil obtained by counter-currently extracting the oil with phenol containing 6% water was contacted with a PM-100 regenerated cellulose membrane (0.4 mils, about 10,000–12,000 MWCO). The feed solution contained 18.6% oil. The membrane operating conditions were set at 100, 200, 300 and 400 psi pressure respectively at a constant temperature of 100° C. Flux was shown to increase from 108 l/m²/day at 100 psi to 375 l/m²/day at 400 psi, as permeate oil contents ranged from 3.8 to 10%. It is clear from this data that very similar results are obtained as have been obtained using the NMP solvent system. See Table VIII.

TABLE VIII

PHENOL RECOVERY FROM LUBE EXTRACT SOLUTIONS USING MEMBRANES (1)
Feed: 60N extract (18.6% oil) in 81.4% phenol/water (containing 6% water)

| Run No. | 1 | 2 | 3 | 4 | 5 | 6 | 7 | 8 |
|---|---|---|---|---|---|---|---|---|
| Operating conditions | | | | | | | | |
| Pressure, psig | 100 | 100 | 200 | 200 | 300 | 300 | 400 | 400 |
| Temperature, °C. | | | | 100 | | | | |
| Flux, l/m²d | 108 | 108 | 142 | 147 | 201 | 200 | 346 | 375 |
| Permeate oil content, % | — | 3.8 | — | 10.4 | — | 8.7 | — | 10.0 |

(1) Membrane: PM-100 regenerated cellulose.

EXAMPLE 10

Solution Concentration Effect

This example demonstrates NMP recovery from feeds of 100N oil extract solutions containing various concentrations of oil using PM-100 regenerated cellulose membrane (0.4 mils, 10,000–12,000 MWCO). The 100N extract solution was contacted with the PM100 membrane at 110° C. at a pressure of 500 psig (3450 KPa). The results are presented in Table IX below. It is to be noted that as the concentration of the oil in the feed increases the permeation rate (flux) of the NMP through the membrane decreases, yet the rejection remains fairly constant.

TABLE IX

| [Oil] % (In Feed) | Flux l/m² day | Rejection % |
|---|---|---|
| 12 | 818 | 50 |
| 19 | 665 | 53 |
| 25 | 620 | 56 |
| 29 | 480 | 55 |
| 35 | 433 | 60 |

EXAMPLE 11

This example demonstrates NMP recovery from feeds derived from 600N waxy distillate extracted with NMP. This extract was cooled to induce phase separation, then mixed to produce an emulsion. These emulsions were then contacted with the membrane (Enka PM 100, MWCO about $10-12 \times 10^3$) at 400 psig. As is seen in Table X it is calculated that the membrane separation of an oil in NMP emulsion produced by cooling the extract to a lower temperature resulting in the formulation of an NMP rich phase yields an NMP permeate having a lower oil content. Performing the membrane separation at lower temperatures improves selectivity.

TABLE X

Feed: 600N Treater Extract Solution (18.6% Extract in NMP, Miscibility Temperature 70° C.)

| Case | I | II | III | Std |
|---|---|---|---|---|
| Temperature, °C. | 65 | 55 | 45 | 70 |
| Vol. Upper Layer, % | 1.49 | 4.23 | 5.34 | 100 |
| Vol. Lower Layer, % | 98.51 | 95.77 | 94.66 | 0 |
| Oil in Upper Layer, % | 62 est. | 63.0 cal'd | 64.7 cal'd | 18.6 |
| Oil in Lower Layer, % | 17.9 est. | 16.6 | 16.0 | 0 |
| After Membrane* | 6.5 | 6.1 | 5.8 | 6.8 |

TABLE X-continued

Feed: 600N Treater Extract Solution (18.6% Extract in NMP, Miscibility Temperature 70° C.)

Separation
Oil in Permeate, LV %
(calc'd)

*Using a 8,000 MWCO membrane at 400 psig

The following examples A and B demonstrate an alternate mode for the practice of the process of the present invention wherein selectivity is improved but at the expense of reduced flux. The data and information presented in these examples constitutes part of the subject matter of Ser. No. 61561286 filed on the same day as the present application in the name of Wan Kei Wan. This method utilizes regenerated cellulose membranes which have been chemically modified by contacting with bifunctional reagents which react with the hydroxy groups present on the anhydroglucose units of the regenerated cellulose polymer resulting in cross linking of the regenerated cellulose membrane.

EXAMPLE A

A PM-100 regenerated cellulose membrane of 0.4 mils thick ~12,000 MWCO available from ENKA AG was reacted in a toluene solution consisting of 10% epichlorohydrin and 20% triethylamine at 90° C. for 1 hour. The reacted membrane was then washed and stored in toluene. It was tested for NMP-Oil separation in a standard permeator apparatus to give the following results:

| Sample #[1] | Modified A-1 | Unmodified A-2 |
| --- | --- | --- |
| Feed Oil % | 20.5 | 21 |
| Flux $1/m^2$ day | 152 | 718 |
| Rejection % | 90 | 55 |

[1] Experimental conditions:
Temperature: 110° C.
Pressure: 3450 Kpa (500 psi)

EXAMPLE B

The same regenerated cellulose membrane as used in Example A was reacted with epichlorohydrin under conditions similar to that used in Example A except the reaction temperature was varied between 60°–90° C. The resulting membrane were tested for NMP-Oil separation under conditions as in Example A to give the following results.

| Sample # | Modified B-1 | Modified B-2 | Modified B-3 | Unmodified B-4 |
| --- | --- | --- | --- | --- |
| Feed Oil % | 18.5 | 19.0 | 20.5 | 21.0 |
| Temperature °C. | 60 | 80 | 90 | — |
| Flux $1/m^2$ day | 480 | 218 | 152 | 718 |
| Rejection % | 68 | 74 | 90 | 55 |

[1] Unreacted regenerated cellulose membrane.

What is claimed is:

1. In a process for the solvent extraction of aromatic hydrocarbon from a hydrocarbon feed stream comprising aromatic and non-aromatic hydrocarbons using an extraction solvent selective for aromatics wherein the hydrocarbon feed stream is contacted with said solvent resulting in the formation of an extract phase and a raffinate phase wherein the major concentration of the solvent and aromatic hydrocarbons is present in the extract and a minor concentration of the solvent is present in the raffinate phase and wherein said solvent is recovered from the solvent rich extract phase, the solvent lean raffinate phase or both for recycle to the solvent extraction process, the improvement comprising:
   (a) recovering selective solvent by contacting at least a portion of the solvent rich extract phase, the solvent lean raffinate phase or both under pressure with a regenerated cellulose membrane under reverse osmosis conditions whereby the solvent selectively permeates through the membrane resulting in the formation of a solvent rich permeate phase and a solvent lean retentate phase; and
   (b) recycling the recovered solvent rich permeate phase to the extraction process.

2. The process of claim 1 further comprising the steps of:
   (c) recovering the balance of the solvent present in the extract phase, the raffinate phase or both by distillation; and
   (d) recycling the pure, recovered selective solvent from step (c) to the start of the extraction process.

3. The process of claim 1 or 2 wherein the solvent containing phase which is contacted with the permselective membrane is the solvent rich extract phase.

4. The process of claim 1 or 2 wherein the solvent containing phase which is contacted with the permselective membrane is the solvent lean raffinate phase.

5. The process of claim 1 or 2 wherein the selective solvent is NMP, phenol or furfural.

6. The process of claim 3 wherein the selective solvent is NMP, phenol or furfural.

7. The process of claim 4 wherein the selective solvent is NMP, phenol or furfural.

8. The process of claim 1 or 2 wherein the hydrocarbon feed stream which is extracted is a lube oil, a transformer oil, an insulating oil, a mineral oil.

9. The process of claim 5 wherein the hydrocarbon feed stream which is extracted using NMP is a lube oil, a transformer oil, an insulating oil, a mineral oil.

10. The process of claim 5 wherein the selective solvent is NMP.

11. The process of claim 6 wherein the selective solvent is NMP.

12. The process of claim 7 wherein the selective solvent is NMP.

* * * * *